United States Patent [19]
LeBreton

[11] Patent Number: 5,560,119
[45] Date of Patent: Oct. 1, 1996

[54] OPTO-MECHANICAL INSTRUMENT TO ACCURATELY MEASURE LINEAR DISTANCES ON FLAT OR CURVED SURFACES WITH INCREMENTING

[76] Inventor: Guy C. LeBreton, 1008 N. Oak Park Ave., Oak Park, Ill. 60302

[21] Appl. No.: 472,638

[22] Filed: Jun. 7, 1995

Related U.S. Application Data

[63] Continuation-in-part of Ser. No. 350,888, Dec. 7, 1994, Pat. No. 5,485,682.

[51] Int. Cl.$^6$ .................................................. G01B 3/12
[52] U.S. Cl. ............................... 33/773; 33/701; 33/780
[58] Field of Search ........................... 33/773, 772, 775, 33/779, 780, 1 PT, 701, 706, 707

[56] References Cited

U.S. PATENT DOCUMENTS

| | | |
|---|---|---|
| 3,494,039 | 2/1970 | Porter . |
| 4,760,647 | 8/1988 | Gillis . |
| 4,914,831 | 4/1990 | Kanezashi et al. . |
| 5,067,249 | 11/1991 | Terrigno . |
| 5,161,313 | 11/1992 | Rijlaarsadam . |
| 5,288,993 | 2/1994 | Bidiville et al. . |

FOREIGN PATENT DOCUMENTS

| | | |
|---|---|---|
| 3245864 | 5/1978 | Germany . |
| A3025686 | 2/1982 | Germany . |
| 2751620 | 6/1984 | Germany . |
| 58101105 | 6/1983 | Japan . |
| 60-36901 | 2/1985 | Japan . |
| 11901010 | 8/1989 | Japan . |
| 2200754 | 8/1988 | United Kingdom . |
| 8505175 | 11/1985 | WIPO . |

OTHER PUBLICATIONS

Advertisements for "Map Mate". (date unknown).
Advertisements for "Precision Map Meter". (date unknown).

*Primary Examiner*—Christopher W. Fulton
*Attorney, Agent, or Firm*—Browdy and Neimark

[57] ABSTRACT

A hand-held scaler for a map or illustration uses a rotary element and an optical sensor at its tip to generate digital pulses when the tip is moved over a map surface. The pulses are counted by a microprocessor. Different pulse counts automatically scale distances on the map. The microprocessor is supplied with a number, e.g., the number miles on the map scale line; then the tip is run over the scale line (or a known distance between two points on the map). The ratio of the number and the pulse count is used to scale arbitrary distances on the map by multiplying the tip pulses by the ratio. A readout shows the scaled distance (or a mathematical function of the distance). The rotary element can be a wheel in an axle or a sphere held in a retainer, like a ball-point pen ball. The sensor has a lamp and photocell to generate pulses by a pattern of reflective and non-reflective areas on the rotary element. The housing has switches for resetting, calibrating, and initializing, and a map-illuminating light. Battery power is cut off after long non-use.

22 Claims, 7 Drawing Sheets

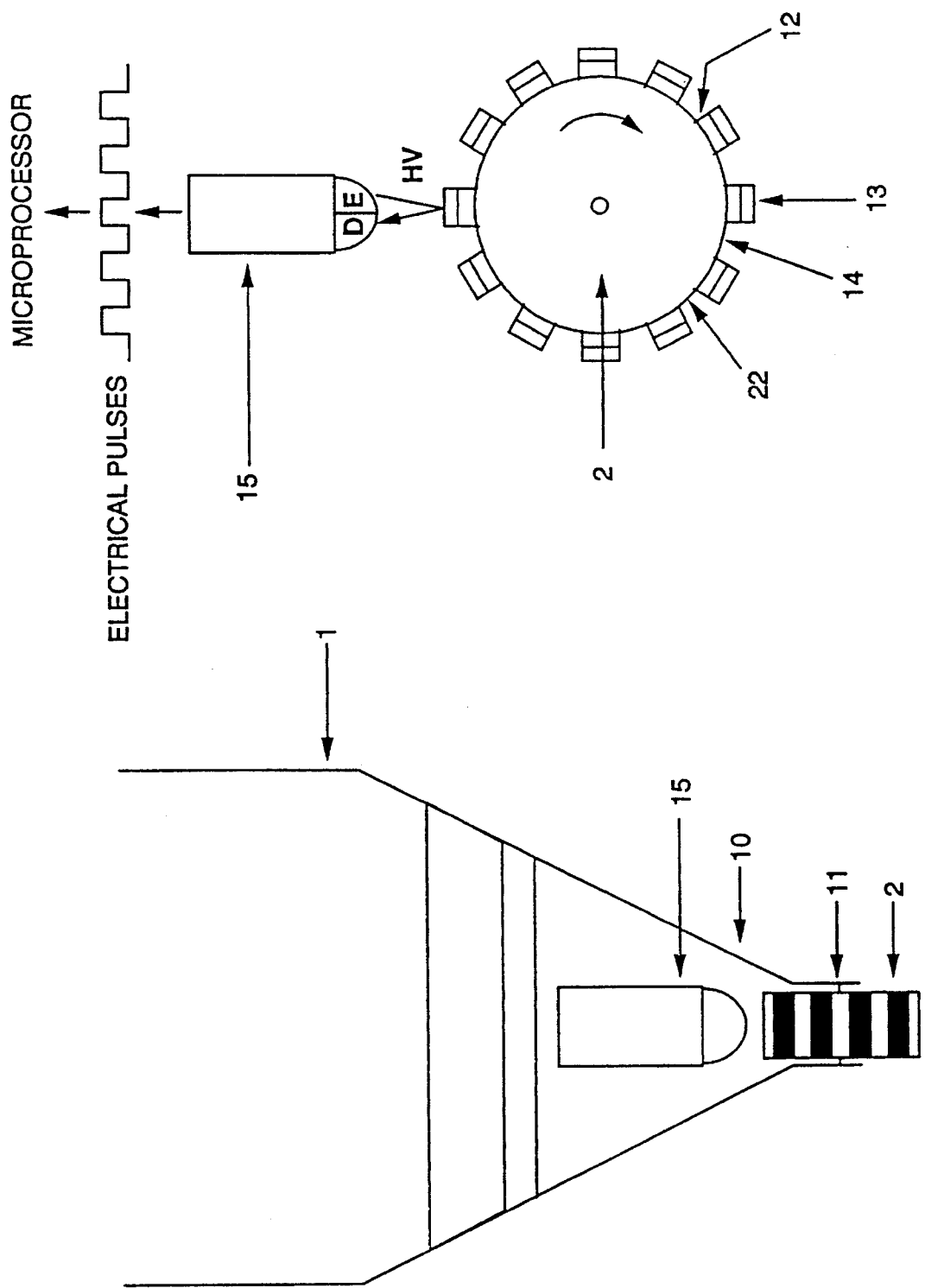

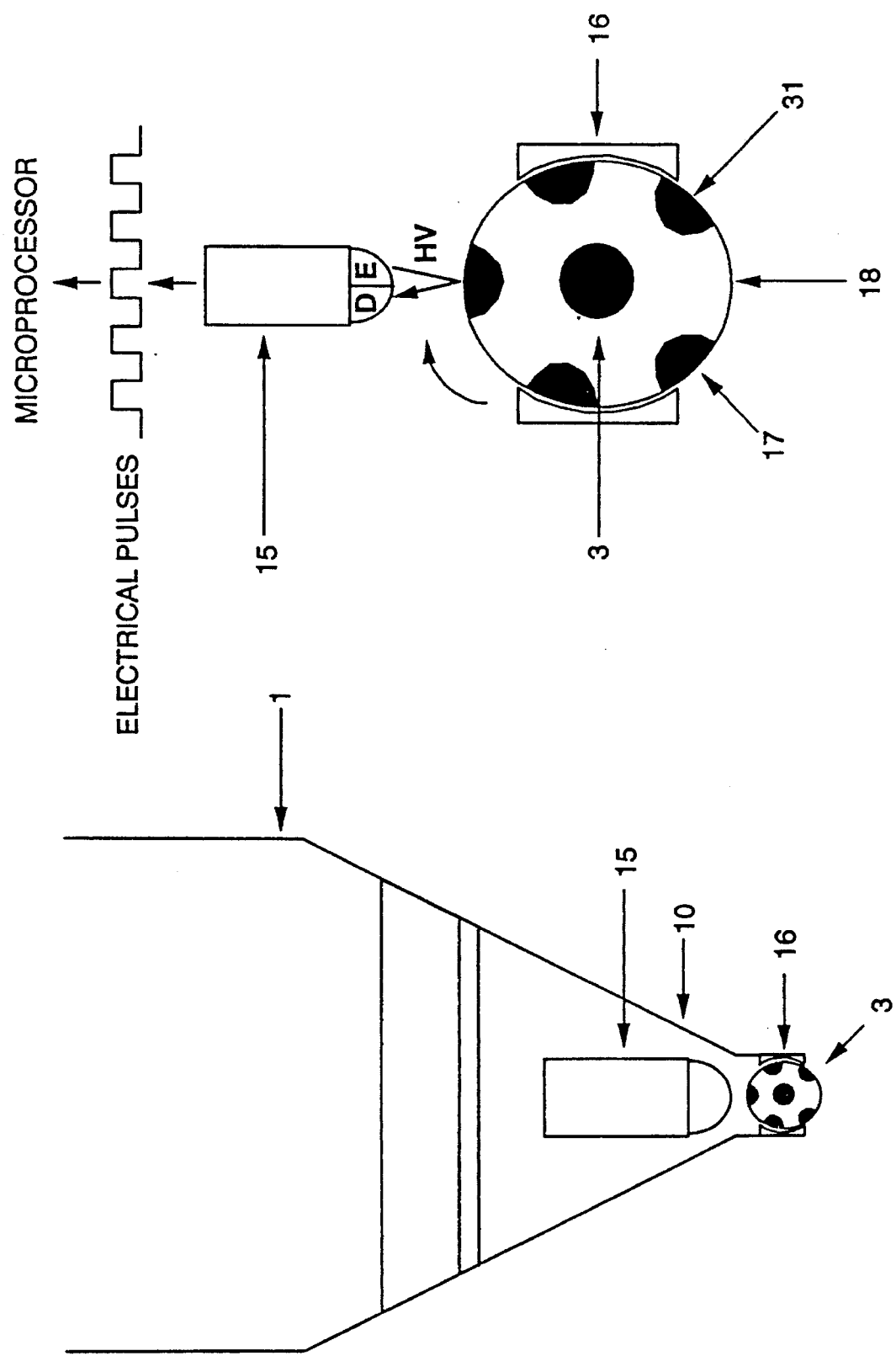

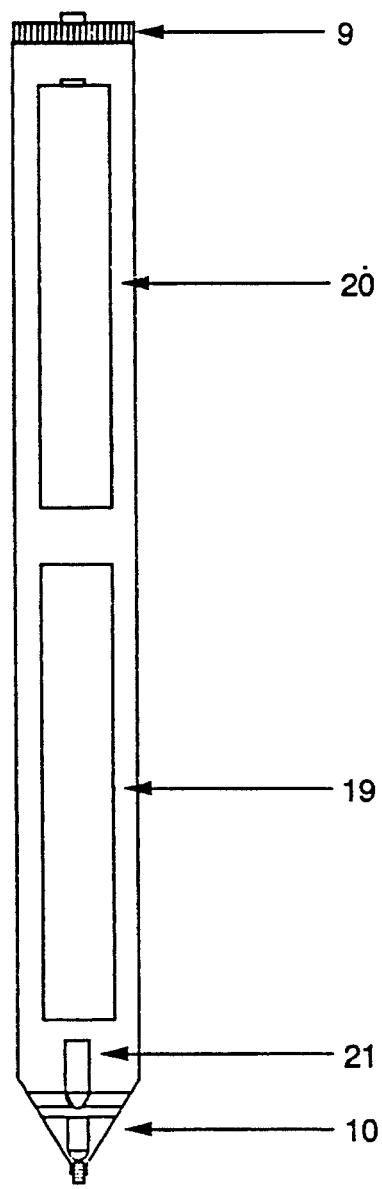
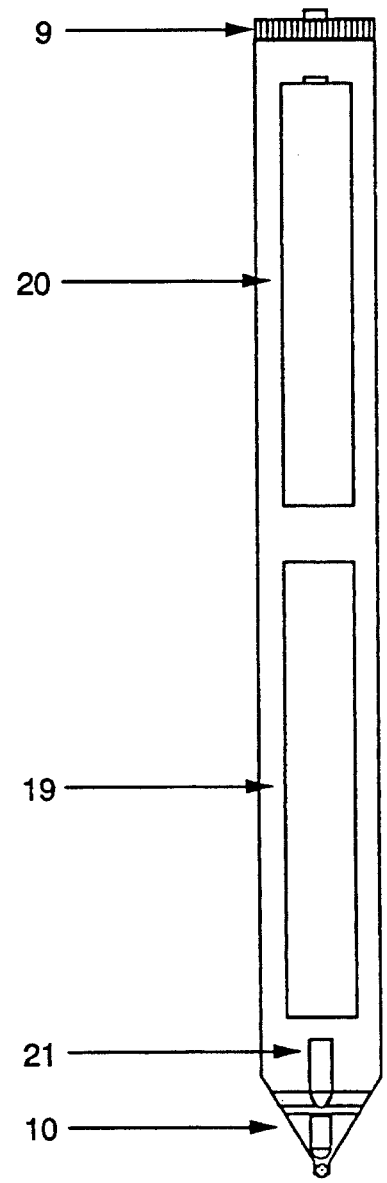
FIGURE 4A
FIGURE 4B

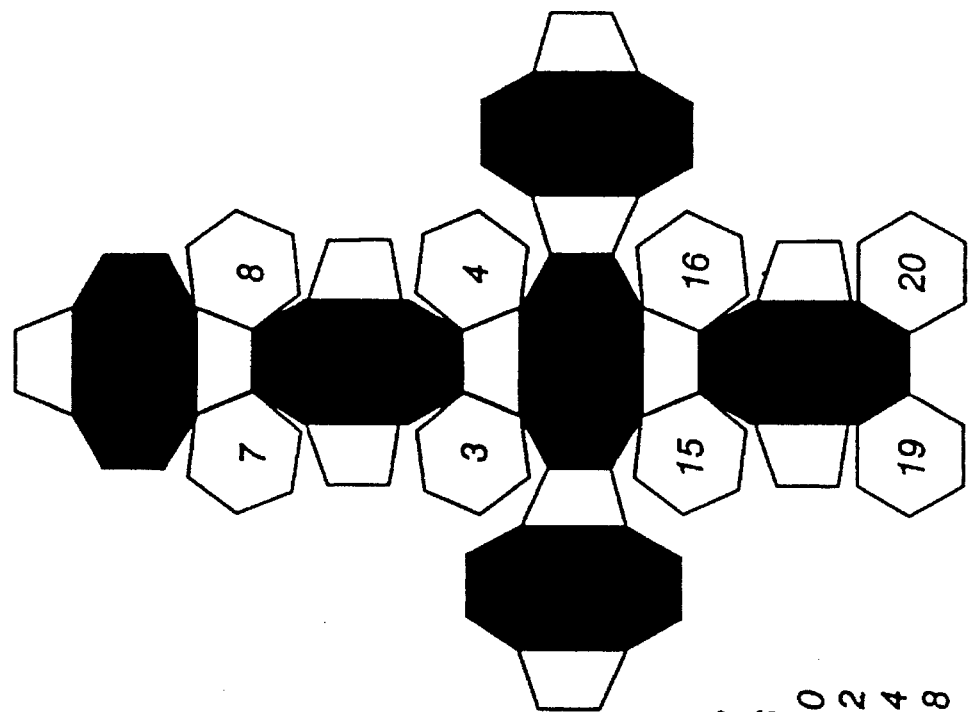
FIGURE 7B
FIGURE 7C
CONNECT HEXAGONS: 1 & 2
5 & 6
9 & 10
11 & 12
13 & 14
17 & 18
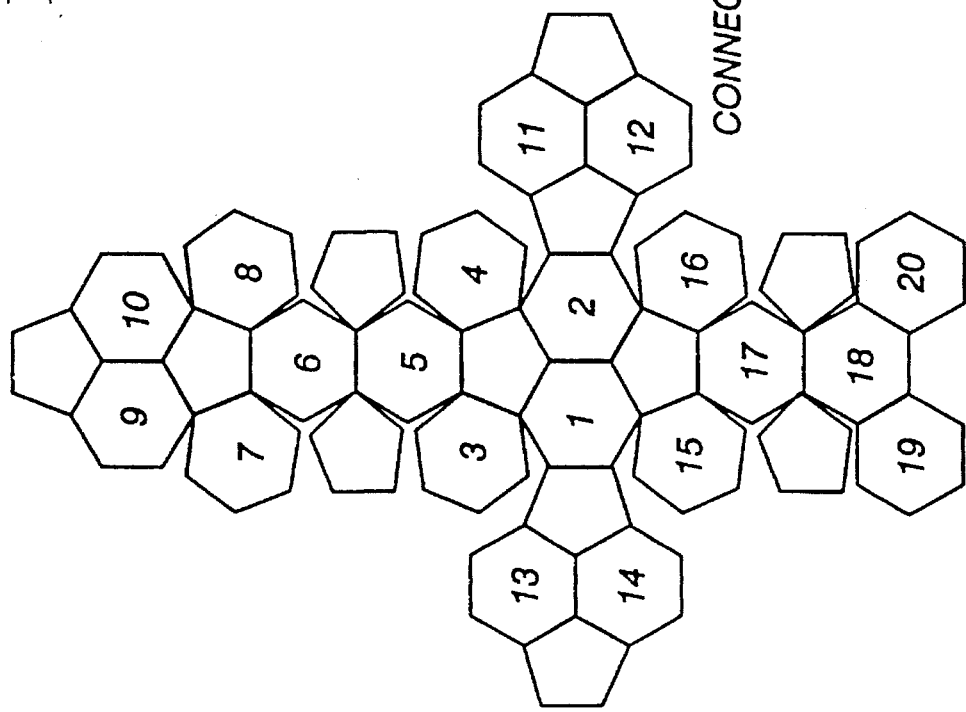
FIGURE 7A

OPTO-MECHANICAL INSTRUMENT TO ACCURATELY MEASURE LINEAR DISTANCES ON FLAT OR CURVED SURFACES WITH INCREMENTING

CROSS REFERENCE TO RELATED APPLICATION

This is a continuation-in-part of application Ser. No. 08/350,888, now U.S. Pat. No. 5,485,682 entitled OPTO-MECHANICAL INSTRUMENT TO ACCURATELY MEASURE LINEAR DISTANCES ON FLAT OR CURVED SURFACES, filed on Dec. 7, 1994, and having the same inventorship as this CIP.

BACKGROUND OF THE INVENTION

1. Field of the Invention

The present invention relates to the construction and use of a self-contained, opto-mechanical instrument to accurately and rapidly measure linear distances on flat or curved surfaces.

2. Description of the Related Art

Historically, graphic representations of objects, illustrated in proper scale, have been extensively utilized in a wide variety of separate disciplines, such as geology, cartography, aerial photography, medical/industrial imaging, architectural/mechanical drawing, just to name a few. Consequently, the ability to perform precise linear distance measurements on these graphic representations is of significant value.

Various inventions capable of performing linear distance measurements have been described in German Patents 3245864, 3025686, 2751620, Japanese Patents 55-36726, 58-101105, 60-36901, 1-191010, U.S. Pat. No. 4,760,647, 5,067,249, 5,161,313, 3,494,039, British Patent 2200754 and World Patent 85/05175. All of the devices depicted in these patents share several common features including:

1. a rotatable tracking wheel which is employed to trace the distance being measured;

2. mechanical or electronic conversion of tracking wheel movement into numerical values; and 3. device calibration in absolute units of measurement, e.g., inches, centimeters, etc.

In spite of these common design features, however, there are notable differences between the measurement capabilities of these inventions. Furthermore, each of these devices has significant design limitations which negatively impact their use in a variety of different measurement conditions.

These limitations generally fall into the following categories:

1. the integration of the measuring device into a single, portable unit;

2. the basic principle by which these devices perform distance measurements and the device calibration requirements;

3. the ability to select different linear units;

4. the ability to select different linear scales;

5. the complexity of device construction and use; and 6. the ability to perform accurate distance measurement of irregularly shaped lines.

1. Self-Contained Design

Certain of these inventions such as patents 3245864 and 3025686 cannot be considered as single, self-contained units, since the former is intended to operate in conjunction with a separate computer, and the latter requires two separate units (a counter unit and a pulse generator probe) which are made to operate together. On this basis, these patents do not possess the portability and size advantages offered by the self-contained devices.

2. Principles of Measurement

All of the previously identified devices measure distances in a single, absolute linear unit, e.g., inches, centimeters, etc. Of the devices which have multiple unit and scale capabilities, the measured distance (in this absolute unit) is then converted into the specific unit and scale of the illustration being measured. The absolute distance measurement principle adopted by these inventions therefore requires accurate device calibration for this linear unit, and maintenance of such calibration accuracy after prolonged use and under adverse conditions. Variation from this calibration state will necessarily result in inaccurate distance measurements.

3. Linear Unit Selection Patents 2200754, 2751620 and U.S. Pat. No. 4,760,647 only measure and display absolute linear units, e.g., inches or centimeters. Consequently, there are no provisions for the selection of linear units other than those for which the device has been calibrated. Other devices can only function to convert measured linear distances into a specific unit. For example, patents 3025686, U.S. Pat. No. 5,067,249, U.S. Pat. No. 3,494,039, 60-36901 and 1-191010 display the distances between points on a map in miles or kilometers; and 55-36726 displays the unit price per length of raw materials. The application of these devices would therefore be highly restricted to specific distance determinations. Only patents U.S. Pat. No. 5,161,313, 85/05175, and 58-101105 appear to provide a means for selecting different units of measurement. However, even in these latter cases, this selection must be made from a limited list, i.e., the most commonly used units.

4. Linear Scale Selection

The provision for multiple scale selection (within a specified linear unit) differs widely in the prior art. Since patents 2200754, 2751620, U.S. Pat. No. 4,760,647 only function as electronic rulers, the devices cannot directly convert measured distances into different linear scales. Even if the devices are calibrated in the same units as the illustration, such conversion can only be achieved by an independent mathematical calculation. This, in turn, requires additional steps for each distance determination.

As previously mentioned, patents 60-36901 and U.S. Pat. No. 5,067,249 only display distances in miles or kilometers. Furthermore, the use of these devices is additionally restricted by a limited number of selectable scales. Thus, these inventions are unable to measure distances on illustrations which are not of the same scale as the predetermined settings on the devices.

Finally, all of the previously described devices which have the capability to adjust for multiple linear scales shown in patents U.S. Pat. No. 5,161,313, 85/05175, U.S. Pat. No. 3,494,039, 1191010, 58-101105, 3245864 and 3025686 require that the operator know the specific scale of the illustration in absolute units, i.e., miles/inch, kilometers/centimeter, etc. On the other hand, many commonly used graphic representations, e.g. road maps, do not always define the calibration distance of the scale bar in absolute units of measure. In these cases, the operator must first perform separate measurements and calculations before the device can be mechanically or electronically adjusted for the proper illustration scale. Thus, if the calibration scale of the illustration is not represented in absolute units, distance measurement using all of these devices would require multiple operator procedures.

5. Complexity of Design and Use

The devices shown in patents U.S. Pat. No. 5,161,313 and 85/05175 offer the greatest flexibility in measuring different units and scales, but are highly complex in their construction and use. This is due to the fact that this invention measures distances in a single, absolute linear unit, and then mathematically converts measured distance values (in this unit) to other units and scales. Because of this method of measurement, the devices require a complex design to accommodate the manual selection of different units of measurement, as well as the manual entry of numerical scale information. Consequently, this invention must possess multiple function keys, as well as a complete numerical keyboard for data entry. Furthermore, the routine use of this device can be complicated and cumbersome. For example, a distance measurement using this invention would first require the operator to select a unit of measurement, e.g., inches, centimeters, kilometers, etc., from a predetermined and limited number of options. If the device does not possess the particular linear unit desired, e.g., microns, angstroms, etc., the distance measurement could not be readily performed. If unit selection is possible, the operator would then manually enter the numerical scale data, e.g., the number of miles per inch. However, if the absolute scale for instance miles per inch of the illustration is not shown (as is the case with many commonly used maps), the operator would first be required to perform an independent measurement and calculation to generate this scale data before it could be entered into the device. Thus, because of the basic method by which the previous art measures distances, i.e., in absolute units, increases in the device's capability to measure different units and scales, necessarily results in corresponding increases in the device's complexity of construction and use.

6. Distance Measurement of Irregularly Shaped Lines

One important consideration in the present art is a device's capability to measure distances along highly curved lines. This capability has, to a large extent, been determined by the size and shape of the device itself, the diameter of the tracking wheel, and restricted movement of the tracking wheel in a single axis of rotation.

Device size and shape are significant factors, since the ease with which an operator can hold and manipulate the device directly affects his ability to accurately trace a non-linear line. In this regard, the dimensions of a common writing instrument would appear to provide the optimum size and shape characteristics for maximum operator control and manipulation. Although patents U.S. Pat. No. 5,161,313, 85/05175, 58-101105, U.S. Pat. No. 5,067,249, 6036901, and U.S. Pat. No. 3,494,039 seem to meet the criteria for ease of device manipulation, the devices shown in patents U.S. Pat. No. 4,760,647, 2751620, 2200754 and 1-191010 do not suit this description. Consequently, these latter devices could not be readily utilized to precisely trace complex lines.

The tracking wheel diameter is an important consideration for two primary reasons. Firstly, a large diameter can cause visual obstruction of the surface being measured. This is an especially critical factor when short and highly irregular lines are being traced. Secondly, the diameter of the tracking wheel defines the degree of curvature (degrees of arc per unit length) of the wheel circumference. This degree of curvature, in turn, determines the extent of contact between the wheel and the illustration surface. Since accurate tracing can only be achieved if this contact length is smaller than the radius of curvature defined by the line, the devices which possess the smallest wheel diameters, also have the greatest potential for providing the most accurate tracing capabilities. In this connection, however, the mechanical or optomechanical methods used by patents U.S. Pat. No. 5,161,313, 85/05175, 58-101105, 5,067,249, 60-36901, and U.S. Pat. No. 3,494,039 severely limit the minimum wheel diameter which can be reasonably employed. Thus, these devices are restricted in their ability to accurately trace highly curved or irregularly shaped lines.

The utilization of a tracking wheel to trace lines can also lead to measurement inaccuracies. Specifically, since a wheel moves about a single axis of rotation, accurate line tracing requires that the wheel be positioned in a particular orientation relative to the line being traced. Consequently, patents 58-101105, U.S. Pat. No. 5,067,249, 60-36901, and U.S. Pat. No. 3,494,039, require that the operator manually align the tracking wheel to this orientation during distance measurements. In practical terms, the ability of the operator to maintain proper wheel orientation would be determined by the considerations previously discussed, i.e., the size and shape of the device, the degree of visual obstruction caused by the tracking wheel, and the extent of contact between the wheel and the illustration surface. Consequently, a device which could be easily manipulated in the hand, and which had a small wheel diameter relative to the curvature of the line, would provide the best potential for tracing highly complex lines.

In an attempt to eliminate this requirement for manual orientation, the devices shown in patents U.S. Pat. No. 5,161,313 and 85/05175 allow the tracking wheel to swivel in a plane perpendicular to the axis of wheel rotation, in a manner analogous to a common caster. Thus, movement of these devices in a specific direction causes the tracking wheel to align itself in the proper orientation relative to the line being traced. Although this design reduces the need for operator manipulation of the device, it also introduces a potential source of measurement inaccuracies. Specifically because of this design, the swiveling action of the caster, itself, will cause rotation of the measuring shaft (50), which, in turn, can result in extraneous pulse generation. This phenomenon could therefore lead to cumulative pulse counting errors during the tracing of irregularly shaped lines, where caster rotation would be the most pronounced.

Furthermore, caster movement of the tracking wheel does not eliminate the need for a small wheel diameter, since the operator must be capable of observing sudden changes in line direction in order to move the device in the appropriate direction.

In short, each of the previously described inventions has certain limitations relative to size, flexibility of unit/scale selection, complexity of design, and measurement accuracy in tracing highly complex lines. These limitations are primarily due to the optical or mechanical methods the devices use to translate tracking wheel movement into distance values, as well as the basic principle by which the devices measure distances in absolute linear units.

CROSS REFERENCE TO RELATED APPLICATION

The claimed invention is a self-contained, opto-mechanical instrument to rapidly, precisely and accurately measure linear distances on flat or curved surfaces. In order to permit easy manipulation by one hand and facilitate accurate distance measurement, the invention's overall size and shape are comparable to a common writing pen. Distance is sensed by the use of either a tracking wheel or a tracking sphere, depending upon the particular version of the instrument. These tracking devices are collectively referred to as the tracking sensor, and can be manufactured of highly reflective material.

The tracking wheel has gear cogs along its entire circumference, and the spaces between the gear cogs are coated with an anti-reflective material.

The tracking sphere has regularly spaced pits or circumferential troughs engraved on its surface, and the bottoms of these pits or troughs are coated with anti-reflective material. One example of a regularly spaced pit pattern would include the "buckyball" configuration in which the surface of the sphere is divided into regularly spaced pentagons and hexagons similar to a common soccer ball. ("Buckyball" is the nickname of a large molecule on which carbon atoms are disposed in an arrangement reminiscent of the geodesic domes of Buckminster Fuller.) The tracking wheel and sphere will operate in exactly the same manner if the prior reflective surfaces are coated with the anti-reflective material and the surfaces formerly having the anti-reflective coating are left to be reflective.

During distance measurement, the tracking sensor (either wheel or sphere) is made to trace along a specified path between points on an illustration. Rotation of the tracking sensor, as a consequence of movement across the illustration surface, is detected and digitized by a reflective optical switch which is positioned in direct view of the tracking wheel circumference or the tracking sphere surface. The digital pulses are then processed by a microprocessor, which in turn, causes the measured distance to be displayed on an LCD in the actual units represented on the illustration. Control of the microprocessor is accomplished by a reset key, a calibrate key, and an enter key. The instrument is battery powered, and to facilitate use under low ambient light conditions, the instrument provides for illumination of the immediate surface area being measured as well as the LCD display.

As discussed below, the construction and operation principles of this instrument eliminate all of the major limitations of the previously described technologies.

1. Self-Contained Design

The present instrument is entirely self-contained. It does not require external devices for either the determination or the numerical display of measured distances. Consequently, the invention can readily be utilized under "field conditions" without reliance upon additional hardware or software support.

2. Principles of Measurement

One extremely important and unique design feature of this invention is the method of measurement itself. Rather than measuring absolute distances (as has been done in the past), the instrument measures relative distances by "ratio determination". Specifically, the digital pulse information derived from manually inputting the numerical value of a selected scale bar, and thereafter inputting the digital pulse information derived from measurement of the selected scale bar is used to generate a mathematical ratio of pulses per unit distance. This ratio is then used to mathematically convert the pulse information obtained during a measurement into the correctly scaled distance.

The principle of "ratio determination" therefore allows the accurate measurement of distance between points X and Y without requiring instrument calibration to absolute units of measure.

Two additional advantages inherent in the method of "ratio determination" are: automatic compensation for changes in instrument characteristics which may occur over a period of time due to mechanical wear or environmental conditions; and automatic compensation for different operator measurement techniques. Compensation is achieved in the latter case, since both calibration and measurement are performed by the instrument operator.

In summary, the method of "ratio determination" employed by the present instrument provides clear advantages over previously described devices, in which variation from a preset calibration value will necessarily result in inaccuracy of measured distances.

3. Linear Unit Selection

Unlike previous technologies, the present invention has the capability of measuring all possible units of linear measurement. This is because this instrument measures illustration distances relative to the scale bar length. Consequently, the LCD indicator will always display numerical values in the same units as the scale bar, regardless of the linear units employed. Thus, for example, if the illustration is scaled in microns, the LCD will automatically display the measured values in microns. This capability eliminates a significant limitation of the previous technologies, i.e., that unit selection can only be made from a predefined number of possibilities; and if this unit cannot be selected, the measurement cannot be readily performed.

4. Scale Selection

Again, because of the "ratio determination" method used, the present invention is capable of measuring distances using an infinite number of linear scales. Furthermore, this measurement method also eliminates the requirement that the operator know a priori the scale of the illustration in absolute units of measurement.

5. Complexity of Design and Use

The present instrument is of extremely simple construction, being designed to require only a single moving part. Furthermore, because of the measurement principle employed, there is no need for numerous function keys and a complete numerical keyboard. Rather, this instrument utilizes only a reset key, a calibrate key and an enter key to perform all distance measurements. Thus, the present invention possesses the flexibility of measuring every possible linear unit and an infinite number of linear scales, without at the same time increasing the complexity of the design.

The use of this invention to measure illustration distances is also extremely simple. Calibration for any scale, and in any unit of measurement, is achieved by manually rotating the tracking sensor (and/or pressing the calibrate key for more than one sec) until the number of distance units specified by the scale bar appears on the LCD; the scale bar being defined as a known distance between two points on the illustration. After pressing and releasing the calibrate key, the operator traces the length of the scale bar. The operator then presses the enter key, which completes the calibration procedure. Once calibrated, only a single step is required for the instrument to measure any distance on the illustration. The operator simply traces a line between selected points, and the number appearing on the LCD, at any time during the measurement, represents the accumulated distance traversed up to that point of the measurement.

The ability to provide a continuous display of the accumulated distance becomes significant if, for example, the operator wishes to measure the respective distances on an illustration from points X to Y, and then from points X to Z on the same line. A continuous display of the accumulated distance allows this information to be obtained from a single tracing. Thus, the operator can trace from X to Y, note the distance registered on the LCD, continue tracing from points Y to Z, and then note the distance obtained at point Z. Devices which calculate distance after the tracing procedure would require two separate measurements, one between X and Y and a second between X and Z.

In a separate situation, it is frequently desirable to identify the point on an illustration which is a specific distance from another point on that illustration. If, for example, the operator wishes to define the point on a road map which is 125 miles from another point. A continual mileage readout will allow the operator to trace the map route until 125 miles appears on the LCD. This point on the map corresponds to the desired distance. On the other hand, devices which only display the final calculated distance do not possess this capability.

The present instrument can also be used to rapidly calculate the estimated "Traveling Time" between two points on a map. Specifically, the distance between these points is first determined by the procedure described above. Once this value is displayed on the LCD, the calibrate key is momentarily depressed. The operator then manually rotates the tracking sensor until the speed of travel (Speed Number) is displayed on the LCD. Pressing the enter key for more than one second will cause the estimated Traveling Time to appear on the LCD.

In summary, the present instrument is simply constructed and designed to measure distances and calculate travel times by a simple procedure. In addition, this invention provides a direct readout of distance in the appropriate units of measure, as well as a continuous readout of the accumulated distance units during the measurement. Finally, once instrument calibration for a particular illustration has been performed, the calibration data is stored in microprocessor memory, even when the power switch is in the "off" position. This capability eliminates the need for recalibration in future distance determinations on the same illustration or on an illustration with an equivalent scale.

6. Distance Measurement of Irregularly Shaped Lines

The present invention employs two significant design concepts which eliminate the limitations of other devices in measuring irregularly shaped lines: a) the method utilized for optical detection of linear distances; and b) the use of a spherical tracking sensor.

Method of Optical Detection

Of the described technologies in patents 3245864, 55-36726, 2200754, 2751620, U.S. Pat. No. 4,760,647, 3025686, 60-36901, U.S. Pat. No. 5,067,249, U.S. Pat. No. 5,161,313, U.S. Pat. No. 3,494,039, 1-191010, 85/05175 and 58-101105, only the present invention performs distance measurements using reflective optical sensing. Specifically, this instrument positions a reflective optical switch to view reflective areas on the circumference of the tracking wheel or on the surface of the tracking sphere. This particular orientation of the optical switch relative to the tracking sensor is defined as an "in line" configuration. The combined use of optical reflectance sensing and an "in line" viewing configuration provides two significant advantages over the optical transmission methods described in patents 2200754, 60-36901, U.S. Pat. No. 5,067,249, U.S. Pat. No. 5,161,313 and 85/05175.

The first advantage relates to the diameter of the instrument itself, especially at the tapered end of the device. Unlike transmission switches, reflective switches are not required to "straddle" the optical disk. Consequently, an "in line" configuration permits the instrument diameter to be reduced to a size no greater than that of a common writing pen. This is an important consideration, since as previously mentioned, the ease with which an operator can hold and manipulate the device has a direct bearing on his ability to accurately trace a measured distance.

The second significant advantage of employing an "in line" configuration and reflective optical sensing is that a tracking wheel with a far smaller diameter (than previously described devices) can be utilized. This reduction in wheel diameter decreases both the visual obstruction of the surface being measured as well as the "wheel to illustration" contact length.

Spherical Tracking Sensor

Unlike the inventions of the identified patents, the present instrument can also utilize a spherical tracking sensor to measure linear distances. Since a sphere has the capability to uniformly move about all axes of rotation, the tracking sphere will generate electrical pulses regardless of the direction in which the instrument is moved. Consequently, the use of a tracking sphere eliminates the need to position the device in a specific orientation (relative to the axis of the line) during distance measurement.

The design concepts incorporated into the present device therefore allow for a reduction in both the instrument size and tracking wheel size. In addition, this instrument also has the capability of utilizing a spherical tracking sensor. Taken together, these improvements eliminate the limitations of the previously described devices, and significantly enhance the operator's ability to trace highly irregular lines.

In summary, the present invention has the following characteristics:

1. Small, lightweight and self-contained design.

2. Simple construction with only one moving part.

3. Reflective optical sensing.

4. Ratio measurement of measured distances.

5. Autoselection of all possible units of linear measurement.

6. Autocalibration to an infinite number of linear scales.

7. Use of either a tracking wheel or a tracking sphere for distance measurement.

8. No requirement for calibration in absolute linear units.

9. No requirement for knowledge of absolute linear scale of illustration.

10. No requirement for a numerical keyboard.

11. No requirement for numerical data entry.

12. Long-term storage of calibration data.

13. Continuous digital readout of measured distances.

14. Capability to measure distance on highly curved lines.

15. Capability to calculate a numerical quantity using a mathematical function of the measured distance.

16. Illumination of the illustration.

17. Illuminated digital display.

18. Automatic power down.

19. High precision and accuracy.

BRIEF DESCRIPTION OF THE DRAWINGS

FIG. 2A illustrates a longitudinal section and mechanics of the measurement instrument of FIG. 1A.

FIG. 2B illustrates the measurement instrument of FIG. 1A using reflective optical sensing.

FIG. 3A illustrates a longitudinal section and mechanics of the measurement instrument of FIG. 1B.

FIG. 3B illustrates the measurement instrument of FIG. 1B using reflective optical sensing.

FIG. 4A illustrates a plan view of a longitudinal section of the measurement instrument of FIG. 1A.

FIG. 4B illustrates a plan of a longitudinal section of the measurement instrument of FIG. 1B.

FIG. 7 is a geometrical view showing development of the pattern of FIG. 6.

DETAILED DESCRIPTION OF THE PREFERRED EMBODIMENT

In the following description, and in the claims, "incrementing" means both adding to the value in a register and subtracting from or decreasing the value (i.e., decrementing).

Figure 1A:
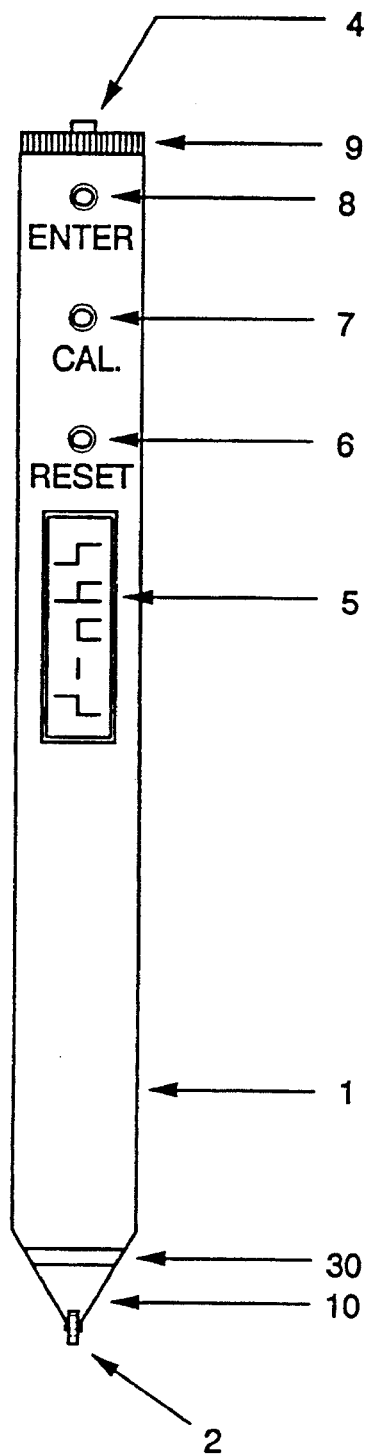
FIGS. 1A and 1B illustrate the front exterior view of two embodiments of the measurement instrument according to the invention respectively using a tracking wheel or a tracking sphere to trace distances.
Figure 1B:
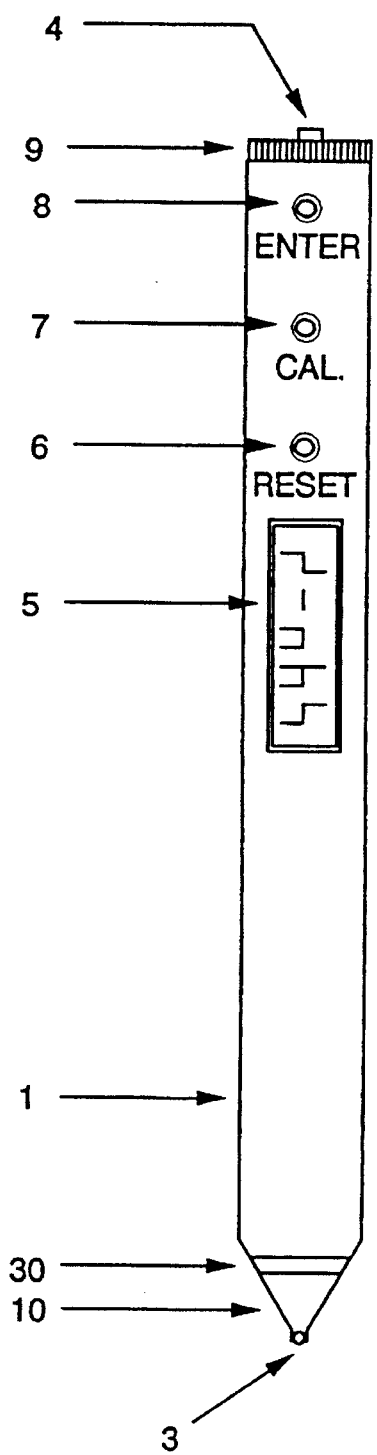

The figures will now be described in detail according to the number of each element. FIGS. 1A and 1B show the front exterior plan of the tracking wheel version and the tracking sphere version, respectively of the measurement devices according to the invention. The external components of these instruments include a cylindrical housing 1 which is tapered inwardly at one end 10. The tapered end 10 supports a rotatable tracking wheel 2 or rotatable tracking sphere 3. A power switch 4 is used to apply internal battery power to the instrument electronics. Distances are digitally displayed by an LCD 5, and the LCD display is cleared by a reset key 6. Instrument calibration is accomplished by the use of a calibration key 7 and an enter key 8. An illumination switch 9 applies power to a lamp in the LCD display and a lamp 21 (see FIGS. 4A and 4B) housed adjacent to the transparent illumination window 30.

FIG. 2A illustrates a cross section and the mechanics of the tracking wheel version. In this version, the tapered end 10 supports a rotatable tracking wheel 2 which is carried on an axle 11 between opposite sides of the housing. The tracking wheel 2 (FIG. 2B) has gear cogs 12 with highly reflective surfaces 13 along its entire circumference. The wheel surfaces 14 between the gear cogs 12 are coated with an anti-reflective material 22. A reflective optical switch 15 is positioned with its longitudinal axis perpendicular to axis 11 of the tracking wheel 2 and in direct view of the tracking wheel gear cogs 12. The reflective optical switch 15 is made to incorporate a light emitter (E) and light detector (D) in the same case. Rotation of the tracking wheel 2 (as a consequence of movement across an illustration surface) causes the gear cogs 12 to sequentially pass in view of the reflective switch. The reflective surfaces 13 of the gear cogs are detected by the optical switch 15 as they pass during rotation to generate a series of electrical pulses.

FIG. 3A illustrates a cross section and the mechanics of the tracking sphere version. In this version, the tapered end 10 supports a rotatable tracking sphere 3 which is carried in a retaining socket 16 supported by the sides of the housing.

The tracking sphere 3 (FIG. 3B) is manufactured of a highly reflective material and has regularly spaced depressions 17 or circumferential troughs engraved on its surface. The bottoms of these depressions or troughs are coated with anti-reflective material 31. A reflective optical switch 15 is positioned so that its longitudinal axis passes through the center of the tracking sphere 3 and in direct view of the highly reflective tracking sphere surface 18. Rotation of the tracking sphere 3 in any direction causes the anti-reflective depressions 17 or troughs to sequentially pass in view of the reflective switch 15 resulting in the generation of electrical pulses.

Figure 6:
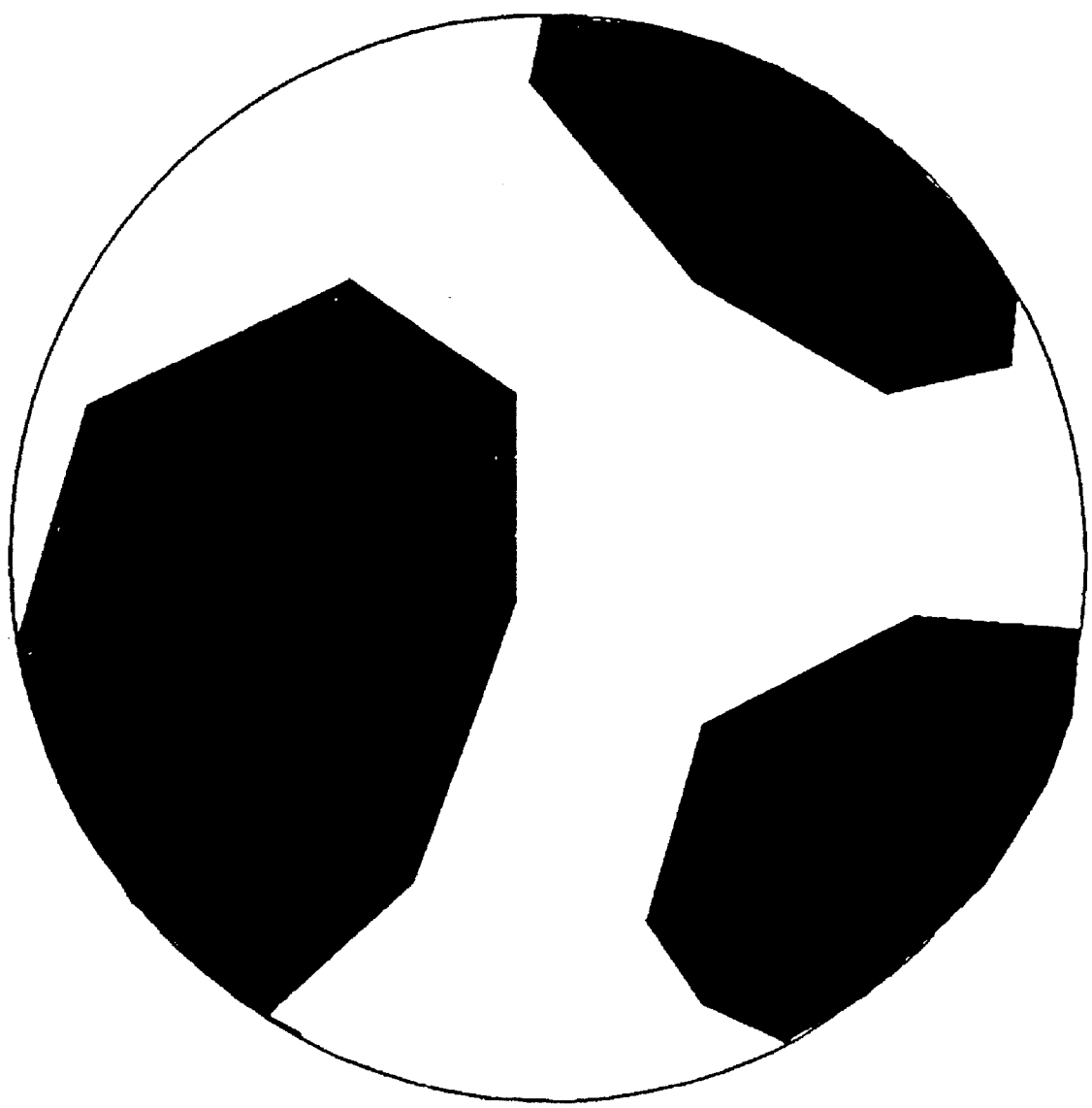
FIG. 6 is a perspective view of a sensor sphere with a modified buckyball pattern.

FIGS. 6, 7A, 7B, and 7C show the preferred pattern of dark and reflective areas on the sphere 3. The pattern is modeled after the "buckyball" molecule's atomic spacing; the pattern also resembles a geodesic dome or a soccer ball. The preferred sensor sphere 3 is shown in FIG. 6 in perspective, while FIG. 7A shows a map of the surface of the sphere 3 developed on flat paper. The pattern consists of hexagons and pentagons; the hexagons are numbered. To create the dark-light pattern of the sensor sphere 3 of FIG. 6, adjoining hexagon pairs are coupled as indicated by the following number pairs: 1 and 2; 5 and 6; 9 and 10; 11 and 12; 13 and 14; and 17 and 18. These pairs are then augmented by adding a triangular corner of the adjoining pentagons, as shown in FIG. 7B. The result is the pattern shown in map form in FIG. 7C, and pictured in FIG. 6. The pattern of FIGS. 6 and 7C is here, and in the following claims, denoted as a "composite" pattern.

FIGS. 4A and 4B show the plan and a longitudinal cross-section of the tracking wheel version and the tracking sphere version, respectively. The electrical pulses generated as a consequence of tracking sensor movement are processed by a microprocessor 19. The instrument is powered by a self-contained battery 20, and an illumination lamp 21 is positioned at the tapered end 10 of the instrument housing. As previously mentioned, activation of this lamp is achieved by an illumination switch 9.

Figure 5:
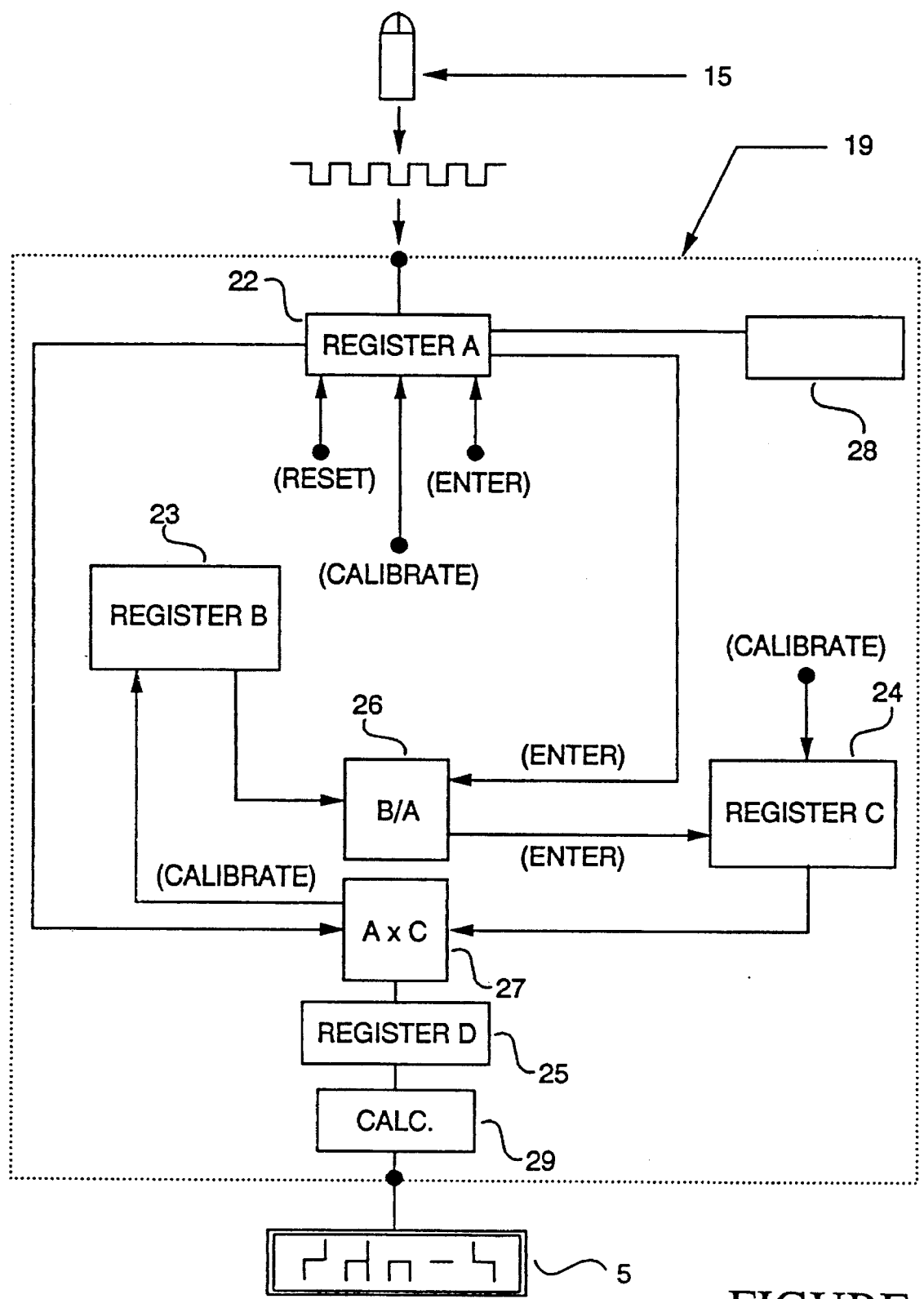
FIG. 5 illustrates the microprocessor for processing digital pulse information into correctly scaled distance units (and quantities derived from mathematical functions using these distance units) of the measurement instrument of FIGS. 1A and 1B.

FIG. 5 illustrates the major elements of a version of microprocessor which is used in the present invention. This microprocessor contains a number of counting/storage registers A (22), B (23), C (24), and D (25). The microprocessor also contains division circuitry 26, which divides the value of register B by the value of register A, i.e. B/A (26), multiplication circuitry which multiplies value of register A by the value of register C, i.e., A×C (27), and sensing circuitry (28), which detects periods of instrument non-use. Specifically, the sensing circuit monitors the pulse number accumulated in register A. If this number remains constant for more than a three minute period, the instrument is automatically powered down. Finally, a calculating element (29) calculates mathematical functions using the numerical value stored in Register D (25).

A list of registers and functions for FIG. 5 is as follows:

Register A contains pulse count numbers P-scale or P-measure;

Register B contains number P-track;

Register C contains quotient C-ratio;

Register D contains the product of Register A times Register C;

initializing means is the function that occurs when the battery is inserted, and it sets third register C equal to one (this function is duplicated by the fourth calibrate function);

power switch on sets first register A to zero and retains the last-held value of third register C;

power switch off sets first register A equal to zero and sets second register B equal to zero;

first enter means (hold enter button <1s) causes box 26 (FIG. 5) to divide B/A;

second enter means (hold enter button <1s) downloads the ratio B/A to third register C;

third enter means (hold enter button >1s) sets first register A equal to one;

first calibrate means (hold calibrate button <1s) downloads A×C into second register B;

second calibrate means (hold calibrate button >1 s) increments first register A and continuously downloads A×C into the second register B;

third calibrate means (release calibrate button) resets the first register A to zero;

fourth calibrate means (release calibrate button) resets the third register C to one;

first reset means also sets the first register A to zero;

During calibration and distance measurement, the numerical values of the counting registers are controlled by movement of the tracking sensor as well as the reset, calibrate and enter keys. Specifically, movement of the tracking sensor causes electrical pulses to be generated by the optical switch. These pulses are counted in register A. At one point during calibration, the product of register A times register C, i.e. A×C (27), is downloaded to register B by pressing the calibrate key. This pulse number in register B is defined as $P_{Track}$. At another point during calibration, pressing the enter key causes the pulse number in register A (defined as $P_{Scale}$) to be divided into the pulse number in register B ($P_{Track}$), i.e., $B/A=P_{Track}/P_{Scale}$ (26). The resulting pulse ratio, defined as $C_{Ratio}$, is downloaded to register C by pressing the enter key. During the tracing of distance between two points on an illustration, the pulse number accumulated in register A is defined as $P_{Measure}$. Each 100 milliseconds, the microprocessor multiplies the pulse number in register A by the numerical value of register C (A×C), and downloads this product to register D. For example, during a distance determination the pulse number in register A ($P_{Measure}$) is multiplied by the value of register C ($C_{Ratio}$), and the product of this calculation, i.e., the correctly scaled distance (CSD) is stored in register D. The LCD, in turn, displays the numerical value present in register D at any given time. This numerical value is updated every 100 milliseconds.

The number in register D, corresponding to distance, will usually be the number that is desired by the user and the number that is displayed on the display 5. However, in some applications it is not the distance that is most useful, but rather a mathematical function of the distance. For example, earthquake wave energy is a function of distance from an epicenter. In such cases a mathematical function of the distance can be displayed. For the earthquake, the energy at a point could be displayed merely by rolling the instrument away from the epicenter and viewing the display. Exponential and logarithmic functions are especially useful.

The present invention includes a calculation means 29, shown in FIG. 5 between the register 25 (D) and the display 5. It is to be understood that when reading distances the calculation means 29 merely passes through the distance readings from the register 25 to the display 5; but non-trivial functions can be selected for the calculation means 29 that produce a quantity to be displayed on the display 5 that is not equal to the value of register 25.

The calculation means may be a simple electrical connection for distance reading-only instruments; it may be part of the microprocessor 19 and perform the desired calculations in the conventional manner, by program; it may also be a hard-wired calculating circuit. The instrument may include controls or programming means (not shown) that permit switching from straight distance displays to quantities calculated from the value in register In order to accommodate first time calibration of the instrument, recalibration of the instrument for different scales, or estimation of Traveling Time, the numerical values in registers A, B, and C are set to specific numbers under certain conditions. For example: insertion of the battery causes register C to be set at C =1; activating the power switch sets register A=0, whereas, register C retains the last numerical information downloaded, i.e., C=1 or $C=C_{Ratio}$; pressing the reset key sets register A=0; pressing the calibrate key for more than 1 sec causes the numerical value in register B to incrementally change; releasing the calibrate key sets register A=0 and C=1; and pressing the enter key for more than one sec sets register A=1. Finally, the last numerical value of $C_{Ratio}$ downloaded to register C is maintained in memory when the microprocessor is powered down.

A typical calibration and distance measurement procedure can be summarized as follows. First, power is applied to the instrument, and a known distance between two points on the illustration is selected, e.g. 50 miles. For the purposes of this example, the illustration scale bar will be taken as the known distance. In order to enter the numerical value of this distance (50) into the instrument, two procedures can be used, either separately or in combination. One procedure is to manually rotate the tracking sensor, and the second procedure is to press and hold the calibrate key. In either case, the numerical value of the display is incremented until it equals the specific distance selected, i.e., 50 miles. Pressing the calibrate key causes the pulse information generated by this procedure to be stored in memory as ($P_{Track}$). The tracking sensor is then rolled over the length of the scale bar equivalent to the distance selected, in this case 50 miles. The number of digital pulses generated by this latter procedure is defined as $P_{Scale}$. Pressing the enter key at this point causes the microprocessor to divide $P_{Track}$ by $P_{Scale}$ and store this calibration ratio ($C_{Ratio}$) in memory. During distance determination, the microprocessor counts the pulse number ($P_{Measure}$) generated by tracing the distance between two points on the illustration, and automatically (each 100 milliseconds) multiplies this pulse number ($P_{Measure}$) by the calibration ratio ($C_{Ratio}$). The product of this calculation equals the correctly scaled distance (CSD) between the two points on the illustration. CSD is then stored in memory and is continually displayed on the LCD. In addition, since the ratio ($C_{Ratio}$) remains in memory, even during power down conditions, the instrument remains in calibration for later measurements on the same illustration (or on an illustration with an equivalent scale). Finally, if a one minute time period passes without movement of the tracking sensor, the instrument is automatically powered down.

As previously mentioned, the distance measuring accuracy of other technologies is directly dependent on factory calibration of the device to an absolute unit of measurement, as well as maintenance of this specific calibration state during the lifetime of the device. However, the principle of ratio determination utilized by the present instrument completely eliminates these limitations. This is because the instrument is used to calibrate itself (relative to the length of a known distance on the illustration) prior to the distance measurement. Consequently, the number of digital pulses which are generated per revolution of the tracking sensor can vary from instrument to instrument or during the lifetime of a given instrument, without in any way affecting the accuracy of the measurement.

Consider, for example, an instrument according to the invention (not shown) which is used to measure distances between points X and Y on a specific illustration.

Instrument "A" Characteristics
  Tracking sensor circumference=0.25 inches
  Pulse number per revolution of tracking sensor =10 pulses
Illustration Characteristics
  Scale bar=80 units
  Scale bar=2.65 inches
  Distance X to Y=1.35 inches First time calibration of this instrument after battery insertion would involve rotating the tracking sensor (or pressing the calibrate key) to generate a number on the LCD which is equal to a number represented on the scale bar, i.e., 80 units. Generation of this number (80) would require 8.0 revolutions of the tracking sensor, i.e., 80 pulses divided by 10 pulses/revolution=8.0 revolutions. This pulse number (80) would be stored in memory as $P_{Track}$. The tracking sensor would then be made to trace the length of the scale bar, which can be any arbitrary number, but for the purposes of this example will be defined as 2.65 inches. With a tracking sensor circumference 0.25 inches, 10.6 revolutions of the tracking sensor would be required to traverse the length of the scale bar, i.e., 2.65 inches divided by 0.25 inches per revolution=10.6 revolutions. The number of pulses generated from measurement of the scale bar would therefore be 106, i.e., 10.6 revolutions ×10 pulses/revolution=106 pulses. This pulse number, defined as $P_{Scale}$, divided into $P_{Track}$. The resulting calibration ratio ($C_{Ratio}$) would therefore be 0.755, i.e., 80 pulses divided by 106 pulses=0.755. This calibration ratio ($C_{Ratio}$) would, in turn, be stored in memory and used to normalize all subsequent distance measurements performed on this particular illustration.

Since the actual distance between two points (X and Y) on this illustration is 1.35 inches, tracing this distance would result in 5.4 revolutions of the tracking sensor, i.e., 1.35 inches divided by 0.25 inches/revolution=5.4 revolutions; and 5.4 revolutions would correspond to 54 pulses, i.e., 10 pulses/revolution ×5.4 revolutions=54 pulses. This pulse number (54) is defined as $P_{Measure}$. Multiplication of $P_{Measure}$=54 by $C_{Ratio}$=0.755 yields the correctly scaled distance (CSD) of 40.8 units on the LCD. Thus, the distance measured by instrument "A" is 40.8 units.

Now as an extreme example, consider another instrument according to the invention (not shown) which, due to certain manufacturing variables, has a different tracking sensor diameter and generates a different pulse number per revolution of the tracking sensor. The distance measured by instrument "B" between the same two points X and Y would be as follows.

Instrument "B" Characteristics
  Tracking sensor circumference=0.28 inches
  Pulse number per revolution of tracking sensor =16 pulses
Illustration Characteristics
  Scale bar=80 units
  Scale bar=2.65 inches
  Distance X to Y=1.35 inches
Distance Measurement
  $P_{Track}$=80 pulses
  Number of revolutions to trace the length of the scale bar=2.65 inches/0.28 inches per revolution=9.46 revolutions
  $_{scale}$ =9.46 revolutions ×16 pulses/revolution =151 pulses
  $C_{Ratio}=P_{Track}/P_{Scale}$=80 pulses/151 pulses=0.530
  Distance X to Y=1.35 inches divided by 0.28 inches/revolution=4.82 revolutions
  Distance X to Y=4.82 revolutions ×16 pulses/revolution= 77 pulses=$P_{Measure}$ Correctly scaled distance (CSD) measured by instrument "B"=$P_{Measure} \times C_{Ratio}$=77×0.530=40.8 units Thus, even though instruments "A" and "B" have significantly different tracking wheel diameters and generate different pulse numbers per revolution of the tracking sensor, they measure identical distances between points X and Y on the illustration, i.e., 40.8 distance units. It is also apparent that these units of measurement are defined by the illustration scale bar itself. Thus, if the illustration is scaled in kilometers, the LCD automatically displays values in kilometers. The same would be true for any unit of measurement represented on any given illustration.

Furthermore, the illustration scale used in this example was defined to be 80 units/2.65 inches, or 30.19 units/inch. Therefore, a 1.35 inch distance between points X and Y actually represents 30.19 units/inch×1.35 inches=40.8 units. This actual distance (40.8 units) is identical with the distance measured by both instruments "A" and "B" (40.8 units). Consequently, the principle of "ratio determination" allows the accurate measurement of distance between points X and Y without requiring instrument calibration to absolute units of measure.

What is claimed is:

1. A tracking device for determining and displaying a quantity, the quantity related to a scaled distance over a surface, the device comprising:

a display;

a rotary element adapted to frictionally contact the surface;

a sensor for generating pulses in proportion to a rotation of the rotary element;

a first register (A);

a second register (B);

a third register (C);

counting means for storing a pulse-count number in the first register (A), whereby the pulse-count number may act as selectively a scale number (P-sb) equal to a zeroeth count of the pulses, a scaling distance number (P-scale) equal to a first count of the pulses and a measure number (P-measure) equal to a second count of the pulses;

(first reset) first resetting means for resetting the first register (A) to zero;

(fourth calibrate) second resetting means for resetting the third register (C) to one;

multiplying means for multiplying the first register by the third register to yield a numerical product, whereby the numerical product may act as selectively a track number (P-track) and an argument of a mathematical function;

(first calibrate) means for loading the numerical product into the second register (B) to act as track number P-track;

(first enter) dividing means for dividing the second register (B) by the first register (A) to yield a quotient; and (second enter) means for setting the third register (C) equal to the quotient (C-ratio);

calculating means for calculating the quantity to be displayed according to the mathematical function, of which the numerical product is the argument;

means for displaying the quantity on the display; and (second calibrate) incrementing means for changing the numerical product by incrementing the first register (A); and (third calibrate) means for resetting the first register A to zero;

whereby the first register may be set to zero, the third register may be set to one, the rotary element may be rotated to load into the first register (A) the zeroeth count equal to the scale number (P-sb), the scale number (P-sb) may be incremented, the scale number (P-sb) may be multiplied by one to generate the track number (P-track), the track number (P-track) may be loaded into the second register (B), the means for resetting the first register (A) may reset the first register (A) to zero, the rotary element may be run over a defined illustration length between two scaling points on the surface to load into the first register (A) the first count number equal to the scaling distance number (P-scale), the dividing means may divide the track number (P-track) in the second register (B) by the scaling distance number (P-scale) in the first register (A) to yield a quotient (C-ratio), the quotient may be loaded into the third register (C), the first register (A) may be reset to zero by the means for resetting, the rotary element may be run between two arbitrary points to load into the first register (A) the second count number equal to the measure number (P-measure), the multiplying means may multiply the first register (A) by the third register (C) to yield the numerical product, and the quantity equal to the mathematical function of the product may be displayed.

2. The tracking device according to claim 1, wherein selectively:

the first resetting (first reset) means for resetting the first register (A) to zero;

the second resetting (fourth calibrate) means for resetting the third register (C) to one;

the (first calibrate) means for loading the numerical product into the second register (B);

the (first enter) dividing means;

the (second enter) means for setting the third register (C) equal to the quotient (C-ratio);

the (third calibrate) means for resetting the first register (A) to zero; and the (second calibrate) incrementing means;

comprise at least one momentary-contact switch, first means for activating when the switch is closed for less than a predetermined time interval, and second means for activating when the switch is closed for more than the predetermined time interval, and third means for activating when the switch is opened after previously being closed.

3. The tracking device according to claim 1, wherein the multiplying means functions repeatedly and automatically.

4. The tracking device according to claim 1, wherein the tracking device is electrically powered, and further comprising:

means for automatically powering down the device; and retention means for maintaining a last-held value in the in the third register when powering up the device;

whereby the device may be used without reinitializing when powering up the device.

5. The tracking device according to claim 1, wherein the mathematical function is the identity function, and further comprising (third enter) means for setting the first register (A) equal to one;

whereby to estimate a traveling time to traverse an already-scaled distance between two points on an illustration when traveling at a specified speed, the already-scaled distance being the numerical product:

the (first calibrate) means for loading the numerical product into the second register may load the already-scaled distance into the second register (B);

the (fourth calibrate) second resetting means may set the third register (C) equal to one;

the (third calibrate) means may set the first register (A) equal to zero;

the rotary element may be turned to input into the first register (A) the pulse-count number to act as a speed number;

the (first enter) dividing means may initiate the dividing means may be activated, such that the quotient is a time number equal to the already-scaled distance divided by the speed number;

the (second enter) means for setting the third register (C) equal to the quotient may download the time number to the third register (C);

the (third enter) means for setting the first register (A) equal to one may be activated;

the multiplying means may yield the traveling time equal to the time number times one; and the display means may display the traveling time required to traverse the already-scaled distance when traveling at the specified speed.

6. The tracking device according to claim 1, wherein the counting means, the dividing means, the multiplying means, the calculating means, the first register, the second register, and the third register further comprise a microprocessor.

7. The tracking device according to claim 1, wherein the rotary element includes first areas and second areas, the sensor is disposed proximal the rotary element, the sensor generates pulses depending on proximity to selectively the first areas and the second areas, and the rotary element comprises selectively a wheel rotatable on an axle, the wheel circumferentially including alternatingly a one of the first area and a one of the second area and a sphere rotatably held within a retaining socket, the sphere including a pattern of the first area and the second area, the pattern such that the rotation of the sphere about and arbitrary axis disposes proximal the sensor alternatingly a one of the first area and a one of the second area.

8. The tracking device according to claim 7, wherein the rotary element is a sphere and the pattern is a buckyball pattern consisting of regularly spaced geometric elements.

9. The pattern according to claim 8, wherein selected geometric elements are connected to yield a composite pattern.

10. The tracking device according to claim 7, wherein the rotary element includes reflective areas and non-reflective areas, the sensor includes a light source and photocell, and the sensor is disposed proximal the rotary element and distal the surface.

11. The tracking device according to claim 1, wherein the mathematical function of the numerical product is selectively the identity function, the arithmetic function, the logarithmic function, and the exponential function.

12. The tracking device according to claim 1, including an elongate housing, a battery space disposed within the housing, and a display on an exterior of the housing.

13. The tracking device according to claim 12, further comprising a lamp for illuminating the surface and a lamp switch for activating the lamp.

14. The tracking device according to claim 1, including initializing means for setting the third register (C) to one when the battery is inserted into the battery space.

15. The tracking device according to claim 1, including means for retaining a (C-ratio) value in the third register (C) during power-down of the device.

16. The tracking device according to claim 13, wherein the incrementing means includes means for incrementing at regular time intervals while a momentary-contact switch is closed.

17. The tracking device according to claim 1, including restricting means for preventing the dividing means from dividing when either one of the second register (B) and the first register (A) is zero.

18. A process of scaling an arbitrary line on a surface having a scale illustration having a numerical value (P-track) which represents the scaling distance between two points on the illustration; the process comprising:

providing a microprocessor adapted to count pulses and to divide, generate ratios, multiply, and store numbers in a first register (A), a second register (B), and a third register (C);

providing a rotary element adapted to frictionally contact the surface;

providing a sensor for generating pulses in proportion to a rotation of the rotary element and sending the pulses to the microprocessor;

rotating the rotary element to load into the first register (A) a zeroeth count equal to a scale number (P-sb);

incrementing the scale number (P-sb);

using the scale number (P-sb) in a multiplying function in the microprocessor to yield a track number (P-track);

loading the value of (P-track) into the second register (B);

resetting the first register (A) to zero;

running the rotary element over the scaling distance between the two scaling points on the surface to load into the first register (A) a first count number equal to the scaling distance number (P-scale);

dividing the track number (P-track) in the second register (B) by the scaling distance number (P-scale) in the first register (A) to yield a quotient (C-ratio);

loading the quotient (C-ratio) into the third register (C);

resetting the first register (A) to zero;

running the rotary element between two arbitrary points to load into the first register (A) a second count number equal to the measure number (P-measure);

multiplying the first register (A) by the third register (C) to yield the numerical product;

determining a quantity equal to a mathematical function of the numerical product; and displaying the quantity.

19. The process according to claim 18 further comprising the steps of:

providing a housing;

providing at least one reset switch;

providing a display;

mounting in the housing the microprocessor, the rotary element, the sensor, the at least one reset switch, and the display; and displaying on the display the correctly scaled distance.

20. The process according to claim 19, further comprising means for selecting the mathematical function.

21. A tracking device for converting rotation to a distance rolled on an exterior object, comprising:

a housing;

a sphere rotatably held within a retaining socket of the housing, the housing including an opening, a portion of the sphere protruding from the opening for rolling contact with the exterior object; and an optical sensor disposed within the housing proximal the sphere, the sensor including a light source and a photocell;

the sphere including a surface pattern of reflective areas and non-reflective areas, such that the sensor generates electrical pulses with rotation of the sphere depending on proximity to selectively the reflective areas and the non-reflective areas;

the surface pattern being a buckyball pattern including regularly spaced geometric elements.

22. The surface pattern according to claim 21, including selected geometric elements connected to yield a composite pattern.

* * * * *